United States Patent [19]

Kakihara et al.

[11] Patent Number: 5,077,113
[45] Date of Patent: Dec. 31, 1991

[54] FILAMENT-REINFORCED RESINOUS STRUCTURAL ROD

[75] Inventors: Ryuichi Kakihara, Ibaraki; Sumio Nishioka, Ashiya; Naohiko Shindo, Ibaraki; Kunihiro Mukae, Yamato; Shin-ichiro Kumagai, Funabashi, all of Japan

[73] Assignee: Teijin Limited, Osaka, Japan

[21] Appl. No.: 580,788

[22] Filed: Sep. 11, 1990

[30] Foreign Application Priority Data

Sep. 14, 1989 [JP] Japan .................................. 1-239463

[51] Int. Cl.$^5$ .......................... E04C 5/07; B32B 5/08; B32B 5/26; B32B 5/28
[52] U.S. Cl. .................................. 428/108; 428/295; 428/373; 428/377; 428/902
[58] Field of Search ............... 428/377, 902, 373, 108, 428/295, 408

[56] References Cited

FOREIGN PATENT DOCUMENTS 199348 10/1986 European Pat. Off. .

Primary Examiner—Alexander S. Thomas
Attorney, Agent, or Firm—Burgess, Ryan & Wayne

[57] ABSTRACT

A filament-reinforced resinous structural rod having a rugged periphery thereof comprises a reinforcing fibrous member impregnated with a polymeric resinous material and comprising a core element composed of a plurality of filament bundles bundled together, a binding element comprising a filament bundle spirally wound around the core element, a plurality of filament bundles arranged in parallel to each other on and along the core element, and a filament bundle spirally wound around the assembly of the core element bound with the wound filament bundle and the plurality of filament bundles in parallel to the filament bundle wound around the core element.

9 Claims, 1 Drawing Sheet

FILAMENT-REINFORCED RESINOUS STRUCTURAL ROD

BACKGROUND OF THE INVENTION

1) Field of the Invention

The present invention relates to a filament-reinforced resinous structural rod. More particularly, the present invention relates to a filament-reinforced resinous structural rod able to be used as a reinforcing member for a structural material made of a concrete or plastic resin material, to thereby enhance the mechanical strength of the structural material.

2) Description of the Related Arts

A conventional fiber-reinforced plastic resin rod (referred to as FRP rods hereinafter) in which the tensile strength is reinforced in one direction by fibers, is known and utilized for various purposes, and when used in place of an iron or high strength steel reinforcing rod for reinforcing a concrete structure, the FRP rod is advantageous in that it has a very high corrosion resistance, and thus the thickness of a concrete layer around the reinforcing rod can be made thinner even under highly corrosive conditions, and has a small specific gravity corresponding to about 1/6 of that of a steel material, and thus allows a reduction of the weight of the resultant reinforced structure.

Also, when used as a stretching or tensing material for a prestressed concrete structure, the FRP rod has a smaller Young's modulus than that of a reinforcing steel material, and thus can be utilized at a lower stress loss than the steel material and can avoid breakages of the stretching material due to stress corrosion.

Research into the conventional stretching materials consisting of the FRP rod was carried out in the U.S.A., the United Kingdom, and the U.S.S.R. from 1950 to 1960, but these conventional types of stretching materials are disadvantageous in that, when a tensile load is continuously applied, the degrees of tensile stresses created on individual reinforcing fibers in the FRP rod-reinforced structure are not even and the tensile strength of the FRP rod is lowered with a lapse of time, i.e., static fatigue occurs in the FRP rod. Therefore, the above-mentioned research was temporarily abandoned.

Recently, however, a new pultrusion method was developed in which reinforcing fibers are bundled to form rods having a uniform cross-section by applying a uniform tension thereto, and as a result, the reduction in the tensile load due to static fatigue was greatly lowered. Accordingly, the utilization of the FRP rod as a stretching material having a non-magnetic property is now under investigation.

When the FRP rod is employed as a reinforcing material or a stretching material for concrete structure, it is very important that the FRP rod has a high bonding property to concrete. Nevertheless, the surface of the FRP rod is coated with a resinous material, and therefore, cannot be firmly bonded to concrete with a chemical bonding agent. Accordingly, the bonding property of the FRP rod to concrete has been enhanced by introducing a twisted wire structure or a braid structure into the FRP rod, to form the FRP rod into an irregular shape. This irregular shape of the FRP rod has a rugged periphery which exhibits an anchoring effect when bonding the FRP rod to concrete.

Japanese Unexamined Patent Publication No. 61-28092 (prior art 1) discloses an FRP rod having a twisted wire structure, and this twisted wire structure type of FRP rod is produced by impregnating a filament core element having a high tensile strength and a low ultimate elongation with a thermosetting resin; applying a dry inorganic powder to the periphery of the filament core element; covering the dry inorganic powder-applied periphery of the filament core element with a knitted or braided fibrous layer; and thermosetting the resin by heating.

Japanese Unexamined Patent Publication No. 60-119853 (prior art 2) discloses a FRP rod having a braid structure, and this braid structure type of FRP rod is produced by braiding a plurality of fine threads having a high tensile strength.

The above-mentioned prior arts 1 and 2 very effectively enhance the resistance of the FRP rod to tensile stress, but the individual reinforcing fibers in the FRP rod are not always extended along the longitudinal direction of the FRP rod, and therefore, the tensile strengths of the individual reinforcing fibers are not sufficiently utilized in the longitudinal direction of the FRP rod, and thus the tensile stresses created in the individual reinforcing fibers are not even and an uneven static fatigue is generated in the individual reinforcing fibers. This phenomenon makes the irregularly formed FRP rod disadvantageous when employed as a stretching material for a prestressed concrete structure.

In view of the above-mentioned prior arts, preferably a new type of FRP rod, in which the tensile strengths of the individual reinforcing fibers are effectively utilized in the longitudinal direction of the FRP rod, is prepared by a pultrusion method so that the individual reinforcing fibers are arranged substantially in parallel to each other in the longitudinal direction of the FRP rod, and the resultant FRP rod has a rugged periphery thereof.

This type of new technique is disclosed in Japanese Unexamined Patent Publication No. 61-274036 (prior art 3). In this type of FRP rod, a continuous filament is spirally wound around a cylinder-shaped continuous filament bundle (core) in which a number of continuous filaments are arranged substantially in parallel to each other in the longitudinal direction of the FRP rod, and bonded to each other through a thermosetting resin, to provide an FRP rod having a rugged periphery thereof.

The technique of prior art 3 is excellent in that the mechanical strength of the individual filaments can be effectively utilized in the longitudinal direction of the FRP rod and the rugged periphery can be formed by employing a small amount of the filaments. Nevertheless, this type of FRP rod is still disadvantageous in that the binding force of the spirally wound filament to the core is not satisfactory, and thus the bonding force of the resultant FRP rod to concrete is not satisfactory. Namely, when a tensile stress is applied to the FRP rod embedded in concrete, the spirally wound filament is separated from the core, and therefore, the FRP rod is not firmly bonded to the concrete. Particularly, when the spirally wound filament consists of an aramid filament, which per se has a relatively low interfacial bonding property to the thermosetting resin, the above-mentioned poor bonding tendency is worsened.

Accordingly, it is necessary to provide a new type of FRP rod in which the spirally wound filament is not easily separated or peeled from the core.

SUMMARY OF THE INVENTION

An object of the present invention is to provide a filament-reinforced resinous structural rod provided with a rugged periphery thereof and having a high bonding property to concrete.

Another object of the present invention is to provide a filament-reinforced resinous structural rod in which binding filaments for a core are firmly fixed to the core.

The above-mentioned objects can be attained by the filament-reinforced resinous structural rod comprising:
(A) a reinforcing fibrous member comprising:
(a) a core element comprising a plurality of filament bundles extending substantially in parallel to each other and along the longitudinal axis of the rod; (b) a first binding element comprising a filament bundle spirally wound at predetermined pitches around the core element; (c) a second binding element comprising a plurality of filament bundles arranged substantially in parallel to each other and along the longitudinal axis of the rod on the core element and the first binding element and interwoven with the spirally wound filament bundle of the first binding element; and (d) a third binding element comprising a filament bundle spirally wound around the core element and the second binding element, and substantially in parallel to the filament bundle of the first binding element, and interwoven with the filament bundles of the second binding element; and
(B) a matrix member comprising a polymeric resinous material with which the reinforcing member is impregnated.

DESCRIPTION OF THE PREFERRED EMBODIMENTS

Figure 1:
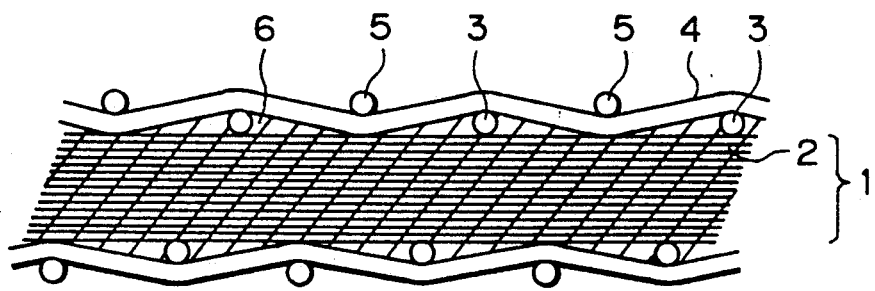
FIG. 1 is an explanatory longitudinal cross-sectional profile of a filament-reinforced resinous structural rod of the present invention.

The filament-reinforced resinous structural rod comprises (A) a reinforcing fibrous member and (B) a resinous matrix member with which the reinforcing fibrous member is impregnated.

The reinforcing fibrous member (A) comprises (a) a core element, (b) a first binding element, (c) a second binding element, and (d) a third binding element.

The core element (a) comprises a plurality of filament bundles extending substantially in parallel to each other and along the longitudinal axis of the rod.

In the core element, the filament bundles preferably comprise at least one type of filaments selected from the group consisting of glass filaments, carbon filaments, and aramide filaments.

Preferably, all of the filaments in the core element have a total volume $(V_f)$ of 30 to 70% based on the entire volume of the core element.

The first binding element (b) comprises at least one filament bundle spirally wound around the core element at predetermined pitches.

In the first binding element, the filament bundle comprises at least one type of filaments selected from the group consisting of glass filaments, carbon filaments, aramid filaments, polyester filaments, aliphatic polyamide filaments, metal filaments and other inorganic filaments, for example, ceramic filaments. Usually, the filament bundle of the first binding element has a total denier of 2,000 to 10,000 and each individual filament therein has a denier of 0.5 to 20.

The filament bundle of the first binding element spirally wound around the core element preferably has a winding pitch of 3 to 20 mm.

The second binding element (c) comprises a plurality of, preferably, 2 to 5 filament bundles arranged substantially in parallel to each other along the longitudinal axis of the rod and on the core element and the first binding element, and interwoven with the spirally wound filament bundle of the first binding element.

In this second binding element, each filament bundle has a total denier of from 2,000 to 10,000 and each individual filament therein has a denier of 0.5 to 20.

Preferably, the filament bundles of the second binding element are evenly distributed at predetermined intervals about the assembly of the core element and the first binding element.

The third binding element (d) comprises at least one filament bundle spirally wound around the assembly of the core element and the first and second binding elements and substantially in parallel to the filament bundle of the first binding element, and interwoven with the filament bundles of the second binding element.

Accordingly, the filament bundle of the third binding element binds the core element bound with the first binding element and the second binding element altogether, to form a rod-shaped article having a rugged periphery which is derived from the filamentary bundles of the first, second, and third binding elements.

In this third binding element, the filament bundle is not interwoven with the filament bundle of the first binding element and this filament bundle comprises at least one type of filaments selected from the group consisting of glass filaments, carbon filaments, aramid filaments, polyester filaments, aliphatic polyamide filaments, metal filaments, and other inorganic filaments, for example, ceramic filaments. Usually, the filament bundle of the third binding element has a total denier of 2,000 to 10,000 and each individual filament therein has a denier of 0.5 to 20.

In the first, second, and third binding elements, the filament bundles of the second binding element are alternately brought into contact with the outside peripheral portions of the filament bundle of the first binding element and with the inside peripheral portions of the filament bundles to the third binding element.

The filament bundle of the first binding element may be of the same type as that of the second binding element.

Alternatively, the filament bundle of the first binding element can be a different type from that of the third binding element.

Preferably, the filament bundle of the first binding element has a higher rigidity and a larger twist number than those of the filament bundle of the third binding element.

The reinforcing fibrous member (A) is impregnated with a resinous matrix member (B) comprising a polymeric resinous material.

The polymeric resinous material comprises at least one thermoplastic polymeric resin or at least one thermosetting resin.

The thermoplastic polymeric resin preferably comprises at least one member selected from polyamide resins, polyetheretherketone resins, polyphenylsulfon resins and polyimide resins.

The thermosetting polymeric resin preferably comprises at least one member selected from unsaturated polyester resins, epoxy resins and vinylester resins, for example, epoxyacrylate resins.

In view of the dimensional and formal stability of the resultant structural rod, the matrix member preferably comprises a thermosetting polymeric resin.

The longitudinal cross-sectional structure of an embodiment of the filament-reinforced resinous structural rod of the present invention is illustrated in FIG. 1.

In FIG. 1, a core element 1 composed of a plurality of filament bundles 2 arranged substantially in parallel to each other is bound with a filament bundle 3 of a first binding element by spirally winding the filament bundle 3 of the first binding element around the core element 1. A plurality of filament bundles 4 of a second binding element are arranged substantially in parallel to each other, along the filament bundles 2 of the core element 1 and on the assembly of the first binding element 3 and the core element 1 so that the filament bundle 4 of the second binding element is interwoven with the filament bundle 3 of the first binding element. Then a filament bundle 5 of a third binding element is spirally wound around the core element 1 and the second binding element 4, and substantially in parallel to the filament bundle 3 of the first binding element, to therewith bind the filament bundle 4 of the second binding element to the assembly of the core element 1 and the first binding element 3.

The resultant reinforcing fibrous member is impregnated with a resinous matrix member 6.

In the production of the filament-reinforced resinous structural rod of the present invention, a number of filament bundles are arranged substantially in parallel to each other, the resultant core element is impregnated with a solution or emulsion of a polymeric resinous material, and then at least one filament bundle of a first binding element is spirally wound around the core element at predetermined pitches to provide an assembly of the resin-impregnated core element and the first binding element. A plurality of filament bundles of a second binding element are arranged, at predetermined intervals from each other, on the assembly of the core element and the first binding element, and substantially in parallel to the filament bundles of the core element, and are interwoven with the wound filament bundle of the first binding element. Then, at least one filament bundle of a third binding element is spirally wound around the assembly of the core element and the first and second binding elements substantially in parallel to the filament bundle of the first binding element, and is interwoven with the filament bundles of the second binding element but not with the filament bundle of the first binding element.

During the above-mentioned steps, the solution or emulsion of the polymeric resinous material impregnated in the core element penetrates the filament bundles of the first, second, and third binding elements and gaps therebetween.

Finally, the solution or emulsion of the polymeric resinous material impregnated in the reinforcing fibrous member is dried, solidified, and optionally, thermoset.

In the resultant structural rod, the filament bundles of the first, second, and third binding elements are firmly bonded to the core element and form a rugged surface of the structural rod. Therefore, when the structural rod is embedded, as a reinforcing material, in a concrete or plastic resin structure, and a tensile stress is applied to the structural rod, the structural rod exhibits a very high resistance to the tensile stress to thereby prevent the withdrawal of the core element from the concrete or plastic resin structure. Also, in the structural rod of the present invention, the mechanical strength of the core element composed of a number of filament bundles can be utilized at a very high efficiency.

In the preparation of the structural rod, the core element impregnated with the polymeric resin liquid may be combined with filament bundles of the first, second, and third binding elements which have been pre-impregnated with the polymeric resin liquid.

EXAMPLES

The present invention will be further explained by the following examples.

EXAMPLE 1

A filament bundle having a yarn count of 1500 denier/1000 filaments was prepared from an aromatic polyether aramid polymer, which was prepared by copolymerizing 25 molar% of p-phenylenediamine, 50 molar% of terephthalic acid chloride, and 25 molar% of 3,4'-diaminodiphenylether by a wet spinning method. This filament bundle was available from TEIJIN LTD., under the trademark of TECHNORA.

A core element was prepared by arranging 150 of the filament bundles in parallel to each other. The resultant core element had a denier of 225,000.

The core element was impregnated with a resinous liquid containing 100 parts by weight of an epoxyacrylate resin and 2 parts by weight of benzoyl peroxide, and in an amount of 5% to 200% based on the weight of the core element.

A filament bundle for a first binding element was prepared by doubling two aromatic polyether aramid filament yarns each having a yarn count of 1500 denier/1000 filaments, and by twisting same at a twist number of 18 turns/10 cm.

The resultant filament bundle of the first binding element having a diameter of 0.5 mm was spirally wound around the core element at a winding pitch of 5 mm, under a tension of 700 g.

A filament bundle for a second binding element was prepared by doubling two aromatic polyether aramide filament yarns each having a yarn count of 1500 denier/1000 filaments.

Three of the resultant filament bundles of the second binding element were arranged in parallel to each other and along the resin-impregnated core element binding the first binding element, at even intervals.

A filament bundle for a third binding element was prepared by doubling two nylon 66 filament yarns each having a yarn count of 1260 denier/204 filaments.

The resultant filament bundle of the third binding element was spirally wound around the assembly of the resin-impregnated core element bound with the first binding element and the second binding element, at a winding pitch of 5 mm, in the same winding direction as that of the filament bundle of the first binding element, substantially in parallel to the wound filament bundle of the first binding element.

The filament bundles of the second binding element were brought into contact with the outside peripheral portions of the filament bundle of the first binding element and with the inside peripheral portions of the filament bundle of the third binding element.

The resultant assembly was heated at a temperature of 200° C. in a heating furnace, to thermoset the epoxyacrylate resin, and a filament-reinforced resinous structural rod having a thickness of 6 mm was obtained. In this rod, the total volume of all of the individual filaments in the core element corresponded to 63.5% of the entire volume of the core element.

Each of two portions of the structural rod having a length of 30 cm was inserted into a steel pipe having an outside diameter of 21.7 mm and an inside diameter of 16.1 m and embedded in a non-shrinking mortar. The mortar portions in the test piece were cured at room temperature for 4 days. The tensile strength of the mortar portion was 390 kg/cm$^2$.

The draw resistance of the structural rod from the cured mortar was determined by using an autographic tensile tester (made by Shimazu Seisakusho) in which the steel pipes of the test piece were fixed to the tester with steel wedges.

The results of the test are shown in Table 1.

COMPARATIVE EXAMPLE 1

The same procedures as in Example 1 were carried out, except that the second and third binding elements were omitted.

The results of the test are shown in Table 1.

TABLE 1

| Example No. | Item Draw resistance (kg) | Bonding strength (*)1 (kg/mm$^2$) |
|---|---|---|
| Example 1 | 6050 | 211 |
| Comparative Example 1 | 4180 | 148 |

Note:
(*)1 The bonding strength was calculated on the basis that the cross-sectional area of the structural rod was 6 mm × 6 mm × 0.785 = 28.26 mm$^2$.

What is claimed is:

1. A filament-reinforced resinous structural rod comprising:
   (A) a reinforcing fibrous member comprising:
      (a) a core element comprising a plurality of filament bundles extending substantially in parallel to each other and along the longitudinal axis of the rod;
      (b) a first binding element comprising at least one filament bundle spirally wound at predetermined pitches around the core element;
      (c) a second binding element comprising a plurality of filament bundles arranged substantially in parallel to each other, along the longitudinal axis of the rod and on the core element and the first binding element, and interwoven with the spirally wound filament bundles of the first binding element; and
      (d) a third binding element comprising at least one filament bundle spirally wound around the core element and the second binding element, and substantially in parallel to the filament bundle of the first binding element, and interwoven with the filament bundles of the second binding element; and
   (B) a matrix member comprising a polymeric resinous material with which the reinforcing fibrous member is impregnated.

2. The structural rod as claimed in claim 1, wherein the filament bundles in the core element comprise at least one type of filaments selected from the group consisting of glass filaments, carbon filaments and aramid filaments.

3. The structural rod as claimed in claim 1, wherein all of the filaments in the core element have a total volume of 30 to 70% based on the entire volume of the core element.

4. The structural rod as claimed in claim 1, wherein the filament bundles of the first and third binding elements respectively and independently from each other comprise at least one type of filaments selected from the group consisting of glass filaments, carbon filaments, aramid filaments, polyester filaments, aliphatic polyamide filaments, metal filaments and other inorganic filaments.

5. The structural rod as claimed in claim 1, wherein the filament bundles in the first and third binding elements, respectively and independently from each other, have a total denier of from 2,000 to 10,000.

6. The structural rod as claimed in claim 1, wherein each filament bundle in the second binding element comprises at least one type of filaments selected from the group consisting of glass filaments, carbon filaments and aramid filaments.

7. The structural rod as claimed in claim 1, wherein each filament bundle in the second binding element has a total denier of from 2,000 to 10,000.

8. The structural rod as claimed in claim 1, wherein the polymeric resinous material in the matrix member comprises at least one thermoplastic polymeric resin selected from the group consisting of polyamide resins, polyetheretherketone resins, polyphenylsulfon resins and polyimide resins.

9. The structural rod as claimed in claim 1, wherein the polymeric resinous material in the matrix member comprises at least one thermoplastic resin selected from the group consisting of unsaturated polyester resins, epoxy resins and vinylester resins.

* * * * *